March 4, 1952     H. E. SCHATZ     2,587,770
FISHING NET
Filed July 11, 1947            2 SHEETS—SHEET 2
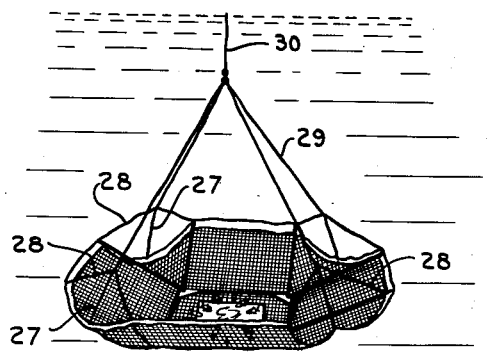
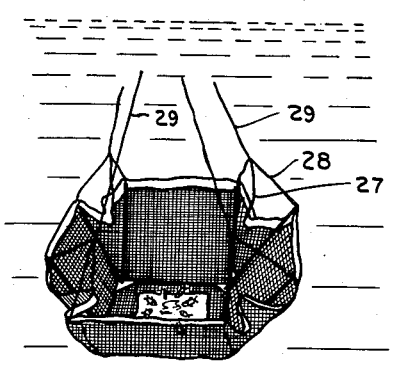
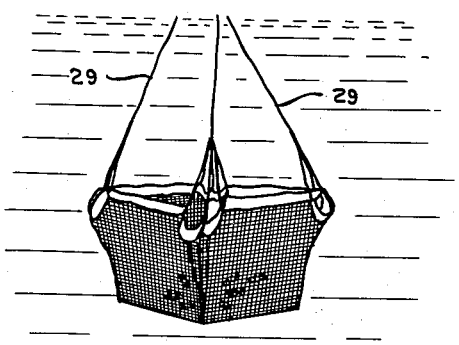
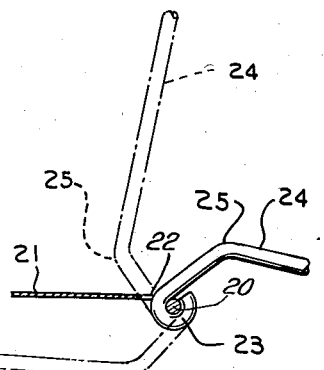
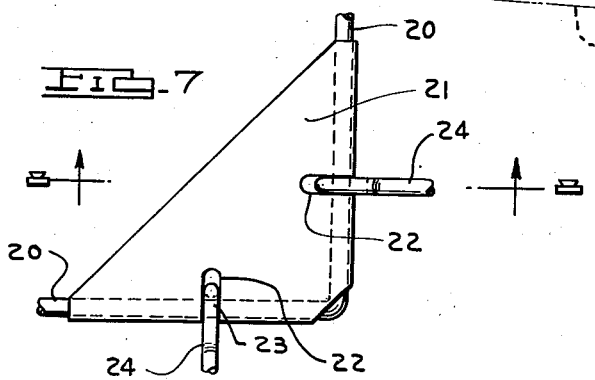
INVENTOR.
HUGO E. SCHATZ
BY Gregory S. Dolgoruki
ATTORNEY

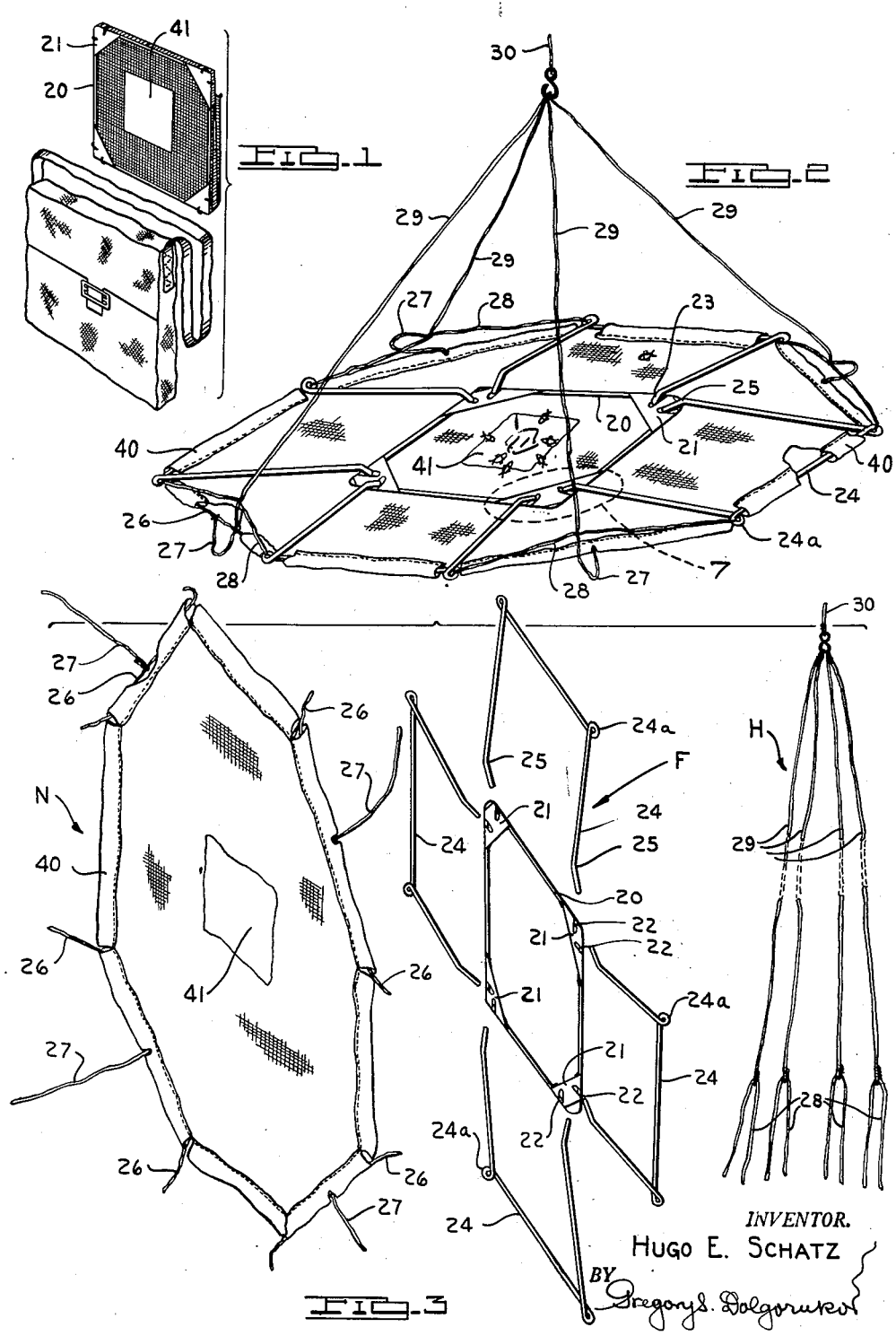

Patented Mar. 4, 1952

2,587,770

UNITED STATES PATENT OFFICE 2,587,770

FISHING NET

Hugo E. Schatz, Detroit, Mich.

Application July 11, 1947, Serial No. 760,252

6 Claims. (Cl. 43—12)

This invention relates to fishing nets and more particularly to an improved fishing net which is particularly advantageous in use as a minnow net.

One of the objects of the present invention is to provide an improved fishing net which can be lowered to the bottom of a body or stream of water and raised therefrom, or be pulled behind a boat, or in other words which can operate while being moved in vertical, horizontal or inclined directions.

Another object of the invention is to provide an improved fishing net which when lowered to the bottom will automatically spread itself flat thereon, following to an appreciable degree the unevenness that may be present on the bottom.

A further object of the invention is to provide an improved fishing net of the character specified in the preceding paragraph, means being provided whereby, as the net is being raised, its sides or peripheral portions rise first to form an enclosure around its central portion, while the central portion remains stationary and virtually undisturbed until the sides form the enclosure and the net is ready to be raised bodily.

A still further object of the invention is to provide an improved fishing net operating in vertically extending directions, means being provided whereby raising the net from the bottom first causes automatic closing or folding movements of its peripheral portions, and thereupon bodily upward movement of the entire net.

A still further object of the invention is to provide an improved net of the character specified in the preceding paragraph, means being provided whereby the open folds occurring in the proccess of raising the peripheral portions of the net are automatically pulled over and closed to prevent escape of fish therethrough.

A still further object of the invention is to provide an improved fishing net having sides or peripheral portions raisable to form an enclosure, means being provided to prevent the raised sides from folding or falling over the central portion and scaring off the fish, should the pull on the net be released for some reason, after the sides are raised, which condition may also occur in the initial lowering of the net.

A still further object of the invention is to provide an improved fishing net comprising an articulated frame and a netting mounted thereon, said frame being adapted to receive the application of concentrated operating forces and to apply them evenly to the netting, thus saving the net from breakage.

A still further object of the invention is to provide a net of the foregoing character which can be simply and easily folded into a compact package and placed into a bag or cover, if desired, such as for carrying, storage or shipping.

A still further object of the present invention is to provide an improved fishing net, particularly a minnow net, which sinks to the bottom and spreads thereon speedily and easily under its own weight, and with a minimum of disturbance.

It is an added object of the present invention to provide an improved fishing net of the foregoing character, which is simple in construction, convenient in operation, and is relatively inexpensive to manufacture.

Other objects of this invention will appear in the following description and appended claims, reference being had to the accompanying drawings forming a part of this specification, wherein like reference characters designate corresponding parts in the several views.

Fig. 1 is a perspective view of my improved net folded up and ready to be placed into a carrying or cover bag.

Fig. 2 is a perspective view showing my improved net in operation and particularly in an open position at the bottom of a body of water.

Fig. 3 is an exploded perspective view showing the frame, the netting and the cord means separately.

Fig. 4 is a perspective view showing my improved net and the relative positions of the parts thereof as its raising begins.

Fig. 5 is a view similar in part to Fig. 4 and showing my improved net as its raising progresses.

Fig. 6 shows my improved net after its sides have fully closed on the central or bottom portion and the bodily upward movement of the net is about to begin.

Fig. 7 is a top view showing on a larger scale one corner of the frame, such as the portion encircled by a dotted line 7 in Fig. 2.

Fig. 8 is a sectional view taken in the direction of the arrows on the section plane passing through the section line 8—8 of Fig. 7.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is shown, by way of example, an improved fishing net embodying the present invention. While the invention is disclosed herein with reference to a fishing or minnow net used by lowering to the bottom from a dock or a boat, it will be understood that it is applicable to nets that may be used as drag nets operated by throwing outwardly from a shore or bank, or towed from a boat. Moreover, my improved net may be made of various sizes and used not only in sport fishing but also for commercial fishing, including crab fishing.

Referring to the drawings, and particularly to Figs. 2 and 3 thereof, the fishing net illustrated therein comprises generally an articulated metal wire frame generally designated by the letter F, a piece of netting N mounted on the frame and connected to it at its peripheral edges, and a cord harness H with the aid of which the frame is operated; the frame, in turn, operates the netting.

The articulated frame F comprises a substantially square central portion or frame 20 provided at its corners with sheet metal pieces 21 adapted to strengthen the frame 20 and to provide nests or slots 22, 22 in which bent ends 23 of the side frames or wings 24 are adapted to operate without undesirable sliding on the frame 20. The ends 23 of the side frames 24 are bent as best shown in Fig. 8 to form loops embracing the central frame 20 for connection therewith. Means are provided to limit the hinged movement of the side frames 24 on the central frame 20 to approximately 270 degrees. In the present embodiment of the invention said means are exemplified by the bent out portions 25 adapted to bear against the corner pieces 21 at the ends of the respective nests or slots 22 as shown in Fig. 8. By virtue of such a construction, the side frames or wings 24 and the netting connected thereto are adapted to spread themselves flat on a flat surface, as illustrated in Fig. 2, to be raised with the aid of the harness H to bring said side frames into substantially perpendicular positions to the plane of the central frame piece 20 as shown in Fig. 6, and to be folded one by one over the opposite or bottom side of said central frame 20 to form a neat and compact package as illustrated in Fig. 1. I prefer that in the raised position of the side frames 24, the angles which they form with the plane of the central frame piece 20 are somewhat larger than 90 degrees, thereby forming an enclosure somewhat larger at the top than at the bottom.

Each of the side frames 24 is of a rectangular shape preferably open at its inner side. At the outer corners of the side frames 24 there are formed eyes or loops 24a for convenient attachment of the reinforcing cord pieces 26 to the middles of which are secured the cross cord pieces 27, in turn secured to corner cord pieces 28. The ends of the corner cord pieces 28 are secured also to the loops 24a. Four pull cords 29 are secured at their ends to the middles of the corner cord pieces 28, the opposite ends of the cord pieces 29 being brought together and secured to the operating cord 30 of any suitable length. It may be preferable to form the four pull cord pieces 29 by providing only two pieces of double length, securing their ends to the corner cord pieces 28, and connecting them at their middles to the operating cord 30.

The piece of netting, generally designated by the letter N, is of octagonal shape, having hemmed edges 40 for passage of the side frames 24 and reinforcing cord pieces 26. The hemming along said edges may be formed by the sewing thereon longitudinally folded pieces of cloth or by turning upon themselves the edges of the netting and sewing together the two thicknesses of the netting thus arranged. A patch 41 is sewn to the netting at the middle thereof and is adapted to receive the bait, such as a quantity of dough, cereal, or the like.

In operation, when the net is raised by operating cord 30, it will assume a position similar to that illustrated in Fig. 6. In such a position, the net is lowered, usually from a boat or a dock, to the bottom. As soon as the central frame 20 reaches the bottom, further lowering of the operating cord 30, causes the side frames 24 to fall down and the entire net to spread itself on the bottom assuming the position illustrated in Fig. 2. For proper unfolding of my improved net it is important that the side frames or wings 24 in their fully raised position are sufficiently inclined outwardly and fall down by themselves without the necessity of jerking the cord or shaking the net. The limiting means for said side frames 24 should be of such a character and strength that they do not become bent or easily broken or worn out thus permitting said side frames to assume in the fully raised position of the net perpendicular or even inwardly inclined positions, causing the above disadvantage. The side frames should also be made of such material that they would sink and carry the netting down with them. Steel wire of ⅛" diameter has been found to give good results for small sportsmen's nets, while aluminum wire of the same diameter proved to be too light for the nets of the same size and character.

After the net has spread itself on the bottom it is left there for a sufficient period of time for the fish scared off by the disturbance created in lowering the net to return and gather around the bait. The net is then rapidly pulled up and the catch removed. Because of the provision of the patch 41 the bait need not be replenished for several sinkings of the net.

In raising the net, the sides rise as shown in Figs. 3-6 gradually forming around the central portion of the net an enclosure open at its top. It is important to note that the open folds in the netting which form between the rising side members 24 are pulled over inwardly by the cross cord pieces 27 preventing the escape of fish therethrough.

The net may be used with equal success from ashore and pulled up along an inclined bottom. In such a use, it may be launched by holding it first in a vertical plane by two of its corners and then throwing it outwardly bringing it at the same time into a horizontal plane. When the net is pulled up along an inclined bottom, its far sides rise first, with remaining sides closing gradually as the net is brought nearer.

After use, the net is spread on the ground or any other flat surface, with its framework F arranged downwardly, and the side frames or wings are folded over the central frame one by one, in any order. The folded net forms a neat and compact package which may be placed into a cover or carrying bag such as shown in Fig. 1.

I prefer to make my improved net with a square central frame having four square wings of a somewhat smaller size, hingedly connected thereto. I consider such a construction particularly advantageous as including less parts and having a number of other advantages. The wings are preferably of a rectangular form. The increase in the number of side frames or wings, while having some advantages, such as making the enclosure more round, increases the number of parts and is generally not desirable. With any number of sides, it is important that their height be less than the transverse dimension of the central portion in order that all sides, when folded, fall within the confines of the central frame, and do not stick out therefrom preventing proper folding of the net. It is not desirable to make the net with a triangular bottom, since such a net cannot be properly folded. With the triangular central frame portion, the corner of the side frames, which are preferably made rectangular with any shape of the central frame, as mentioned, do not permit folding of the net.

I prefer to make the netting with cut away corners giving an octagonal piece of netting for a net with a square central frame, a polygon having twelve sides for a net with a hexagon central frame, and in general a polygon having the number of sides twice that of the central frame. I consider this to be an advantage, since if the netting has the same number of sides as the central frame, the folds formed between the side frames may be too large.

There is thus provided an improved fishing net, whereby the above listed objects of the present invention and numerous additional advantages are attained.

I claim:

1. A folding fishing net comprising an articulated frame and a piece of netting mounted thereon and connected to said frame at the periphery thereof, said frame comprising a central portion having the form of a rectangle, four side sections of rectangular shape with the inner sides thereof open to provide free ends, the ends of said side section at said open side having loops provided thereon and embracing the central portion at the corners thereof for hinged connection thereto and said side section being foldable against the underside of said central portion, and means formed on said ends and said corners adapted to limit the movement of said side sections from their respective folded position against the bottom side of said central portion to about 90 degree angles with respect to the top side of said central portion.

2. A folding fish net comprising an articulated wire frame and a piece of netting mounted thereon and connected to said frame at the periphery thereeof, said frame comprising a central portion in the shape of a rectangle, four side sections of rectangular shape with the inner sides thereof open to provide free ends, loops formed on said ends and embracing said central portion at the corners thereoef, said side sections having shorter sides than the corresponding sides of said central section and foldable flat one over another against the underside of said central portion, and means formed on said ends and said corners to limit the movement of all side portions from their respective folded position against the bottom side of said central portion to about 90 degree angles with respect to the top side of said central portion.

3. A fishing net as defined by the preceding claim 2, said central portion and said side portions being of substantially square shape.

4. A folding fishing net comprising an articulated wire frame and a piece of netting mounted thereon and connected to said frame at the periphery thereof, said frame comprising a central portion in the shape of a polygon having at least four sides, reinforcing pieces at the corners of said central portion, a corresponding plurality of side sections of rectangular shape with one side being open to provide ends, loops formed on said ends to embrace said central portion at openings provided in said reinforcing pieces, the ends of said side sections at said loops having a bend adapted to abut against the reinforcing pieces when the side sections are raised to about 90 degree angles with respect to the top side of said central portion.

5. A folding fishing net comprising a central wire frame of a substantially square shape, a sheet metal reinforcing piece at each of the four corners of said frame and having two slots, four side wire frames of substantially square shape with one side thereof being open to provide two ends on each side frame, loops formed on said ends and embracing the central frame at the slots in said reinforcing pieces, said ends having a bend adjacent said loops adapted to contact the edges of said reinforcing pieces when the side frames are raised to about 90 degree angles with respect to the top side of said central frame, and to adapt said side frames to fold flat one over the other against the under side of said central frame, an octagonal piece of netting mounted on the underside of the central and side frames and connected to said side frames at their peripheries, and cord means adapted for raising the outer sides and the netting around said central frame.

6. A folding fishing net as defined by the preceding claim 5, said cord means including pieces of cord connected to and acting on the netting between the corners of two adjacent side frames to raise the netting thereat substantially simultaneously with raising of the side frames.

HUGO E. SCHATZ.

REFERENCES CITED

The following references are of record in the file of this patent:

UNITED STATES PATENTS

| Number | Name | Date |
| --- | --- | --- |
| 197,313 | Bates | Nov. 20, 1887 |
| 390,218 | Flick | Oct. 2, 1888 |
| 458,456 | Hefftner et al. | Aug. 25, 1891 |
| 679,327 | Newcorn | July 30, 1901 |
| 1,167,732 | Whelen | Jan. 11, 1916 |
| 1,198,524 | Cunliffe | Sept. 19, 1916 |
| 1,786,342 | Greene | Dec. 23, 1930 |
| 1,822,448 | Morin | Sept. 8, 1931 |